US008904456B2

(12) United States Patent
Shen et al.

(10) Patent No.: US 8,904,456 B2
(45) Date of Patent: Dec. 2, 2014

(54) METHODS, APPARATUS, AND SYSTEMS FOR PROVIDING MEDIA CONTENT OVER A COMMUNICATIONS NETWORK

(75) Inventors: Paul Shen, Woodside, CA (US); Jay Shen, Los Altos, CA (US)

(73) Assignee: TVU Networks Corporation, Mountain View, CA (US)

( * ) Notice: Subject to any disclaimer, the term of this patent is extended or adjusted under 35 U.S.C. 154(b) by 198 days.

(21) Appl. No.: 11/704,701

(22) Filed: Feb. 9, 2007

(65) Prior Publication Data

US 2007/0204321 A1    Aug. 30, 2007

Related U.S. Application Data

(60) Provisional application No. 60/773,209, filed on Feb. 13, 2006.

(51) Int. Cl.
*H04N 7/173* (2011.01)
*G06F 15/16* (2006.01)
(Continued)

(52) U.S. Cl.
CPC ....... *H04N 7/17318* (2013.01); *H04N 21/4331* (2013.01); *H04N 21/632* (2013.01); *H04N 21/6581* (2013.01); *H04N 21/23109* (2013.01); *H04N 21/23106* (2013.01); *H04N 21/23424* (2013.01); *H04N 21/2668* (2013.01); *H04N 21/2407* (2013.01); *H04N 21/2225* (2013.01); *H04N 21/2665* (2013.01); *H04N 21/4788* (2013.01); *H04N 21/2393* (2013.01); *H04N 21/47202* (2013.01); *H04N 21/812* (2013.01)
USPC ............... 725/92; 725/98; 725/100; 725/110; 725/115; 725/131

(58) Field of Classification Search
USPC ............................ 725/120, 135, 93, 115, 116
See application file for complete search history.

(56) References Cited

U.S. PATENT DOCUMENTS 5,771,229 A    6/1998    Gavrilovich
6,160,544 A    12/2000    Hayashi et al.
(Continued)

FOREIGN PATENT DOCUMENTS

EP    1 217 803    6/2002
EP    1 389 874    2/2004
(Continued)

OTHER PUBLICATIONS

Modem Bonding, 2 pages, date unknown, downloaded Oct. 3, 2011: <URL: http://lowendmac.com/56k/bonding.shtml>.
(Continued)

*Primary Examiner* — Benjamin R Bruckart
*Assistant Examiner* — Carmine Malangone
(74) *Attorney, Agent, or Firm* — Lipsitz & McAllister, LLC

(57) ABSTRACT

The present invention relates to broadcasting/multicasting of media content over a communication network using shared bandwidth available from peer-to-peer networking. The system of the present invention includes a plurality of broadcast devices, a plurality of receiving devices, a plurality of databases, and a control center. The control center is the central nerve of the network, and provides a number of services, including but not limited to channel control, ad insertion, conditional access, program guide services, and the like. The broadcast device converts media content, which can be television, radio, and other data, received from various content providers, into digital data packets, having a suitable format for transmission over the Internet. Each receiving device will request the relevant packets, decode the received packets, and display or present the media content contained in the packets via an associated device. Packets may be received directly from the broadcast devices or from peers (other receiving devices) on the network.

44 Claims, 9 Drawing Sheets

(51) Int. Cl.

| | | |
|---|---|---|
| *H04N 21/433* | (2011.01) | |
| *H04N 21/63* | (2011.01) | |
| *H04N 21/658* | (2011.01) | |
| *H04N 21/231* | (2011.01) | |
| *H04N 21/234* | (2011.01) | |
| *H04N 21/2668* | (2011.01) | |
| *H04N 21/24* | (2011.01) | |
| *H04N 21/2225* | (2011.01) | |
| *H04N 21/2665* | (2011.01) | |
| *H04N 21/4788* | (2011.01) | |
| *H04N 21/239* | (2011.01) | |
| *H04N 21/472* | (2011.01) | |
| *H04N 21/81* | (2011.01) | |

(56) References Cited

U.S. PATENT DOCUMENTS

| | | | |
|---|---|---|---|
| 6,630,963 B1 | 10/2003 | Billmaier | |
| 6,697,365 B1 | 2/2004 | Messenger | |
| 6,760,765 B1 | 7/2004 | Asai et al. | |
| 6,788,686 B1 | 9/2004 | Khotimsky et al. | |
| 6,801,544 B1 | 10/2004 | Rijckaert et al. | |
| 6,842,446 B2 | 1/2005 | Everson et al. | |
| 6,879,770 B1 | 4/2005 | Van Asten et al. | |
| 6,970,937 B1 | 11/2005 | Huntington | |
| 7,027,460 B2 | 4/2006 | Iyer et al. | |
| 7,035,907 B1 * | 4/2006 | Decasper et al. | 709/212 |
| 7,174,385 B2 * | 2/2007 | Li | 709/231 |
| 7,203,741 B2 | 4/2007 | Marco et al. | |
| 7,542,456 B2 | 6/2009 | Garg et al. | |
| 2002/0040479 A1 | 4/2002 | Ehrman et al. | |
| 2002/0057694 A1 * | 5/2002 | Kamo | 370/395.2 |
| 2002/0143959 A1 | 10/2002 | El-Baze et al. | |
| 2002/0168178 A1 | 11/2002 | Rodriguez et al. | |
| 2003/0002521 A1 | 1/2003 | Traversat et al. | |
| 2003/0009518 A1 | 1/2003 | Harrow et al. | |
| 2003/0013468 A1 | 1/2003 | Khatri | |
| 2003/0078969 A1 | 4/2003 | Sprague et al. | |
| 2003/0105812 A1 | 6/2003 | Flowers, Jr. et al. | |
| 2003/0105831 A1 | 6/2003 | O'Kane | |
| 2003/0126277 A1 | 7/2003 | Son et al. | |
| 2003/0210663 A1 | 11/2003 | Everson et al. | |
| 2004/0015995 A1 | 1/2004 | Shao et al. | |
| 2004/0032910 A1 | 2/2004 | Horng et al. | |
| 2004/0105219 A1 | 6/2004 | McClellan et al. | |
| 2004/0143672 A1 | 7/2004 | Padmanabham et al. | |
| 2004/0181575 A1 | 9/2004 | Mallberg et al. | |
| 2004/0196798 A1 | 10/2004 | Abousleman | |
| 2004/0236863 A1 | 11/2004 | Shen et al. | |
| 2005/0050227 A1 * | 3/2005 | Michelman | 709/245 |
| 2005/0055718 A1 | 3/2005 | Stone | |
| 2005/0101319 A1 | 5/2005 | Murali et al. | |
| 2005/0185578 A1 | 8/2005 | Padmanabhan et al. | |
| 2005/0223102 A1 | 10/2005 | Zhang et al. | |
| 2006/0063546 A1 | 3/2006 | Fischer | |
| 2006/0107286 A1 * | 5/2006 | Connor et al. | 725/31 |
| 2006/0174025 A1 | 8/2006 | LaRue, Jr. et al. | |
| 2006/0174160 A1 | 8/2006 | Kim | |
| 2006/0187860 A1 | 8/2006 | Li | |
| 2006/0218620 A1 * | 9/2006 | Nadarajah et al. | 725/151 |
| 2006/0224759 A1 | 10/2006 | Fang et al. | |
| 2007/0011260 A1 | 1/2007 | Chiu | |
| 2010/0322259 A1 | 12/2010 | Garg et al. | |

FOREIGN PATENT DOCUMENTS

| | | |
|---|---|---|
| EP | 1 427 170 | 6/2004 |
| EP | 1 630 684 | 3/2006 |
| JP | 2001202330 | 7/2001 |
| WO | 99/30493 | 6/1999 |
| WO | 00/69163 | 11/2000 |
| WO | 03/090485 | 10/2003 |
| WO | 2004/016019 | 2/2004 |
| WO | 2004/063840 | 7/2004 |
| WO | 2004/094980 | 11/2004 |
| WO | 2005/078623 | 8/2005 |
| WO | 2005/091585 | 9/2005 |
| WO | 2006/005334 | 1/2006 |
| WO | 2007/012914 | 2/2007 |

OTHER PUBLICATIONS

C.H. Choi, et al. "Adaptive Image Quantization Using Total Variation Classification", Hong Kong University of Science and Technology, (Dec. 31, 1993), 4 pages.

Xu, et al., "A CDN-P2P Hybrid Architecture for Cost-Effective Streaming Media Distribution", XP-002615891, pp. 1-30, Jan. 1, 2004.

* cited by examiner

ISOLATED PEER TO PEER GROUP

METHODS, APPARATUS, AND SYSTEMS FOR PROVIDING MEDIA CONTENT OVER A COMMUNICATIONS NETWORK

This application claims the benefit of U.S. Provisional Application No. 60/773,209 filed on Feb. 13, 2006.

BACKGROUND OF THE INVENTION

The present invention relates to the provision of media content, such as television services, over a communications network, such as the Internet. More specifically, the present invention relates to broadcasting/multicasting of media content over the Internet using shared bandwidth available from peer-to-peer networking.

Traditional broadcast television services are provided over dedicated broadcast channels that require large amounts of bandwidth and broadcasting resources. Traditional television networks also have channel count limits imposed by bandwidth availability of the transmission medium.

The present invention provides advantages over the existing broadcast television mediums, such as terrestrial, cable and satellite mediums. In particular, the present invention provides a global broadcasting television service which uses existing broadband resources to reach a global audience—potentially 170 million households and growing. The present invention enables anyone with an existing high-speed Internet connection to receive live digital broadcast-quality television programs anywhere in the world on an existing television or other suitable video appliance or display. The present invention provides a program-rich, feature-rich, and cost-effective alternative to traditional cable or satellite television services. Content management and encryption technology is also provided, so that all content provided via the present invention is traceable and protected.

Unlike traditional television networks, which are constrained by geographic boundaries, the television services provided by the present invention are accessible globally, and are limited only by the availability of a broadband network connection. Moreover, the present invention is capable of supporting an unlimited number of channels, which is not possible with conventional broadcast, satellite or cable television systems.

The present invention is also advantageous in that it uses the Internet, and does not require the construction of any new infrastructure. In addition, the present invention enables content providers to deliver their programs with low cost real-time servers and affordable (several megabits) Internet connections. Such capabilities result in a dramatically reduced carrying cost for the system as compared to traditional cable and satellite television systems.

In addition, unlike prior art IP-based video streaming technology which dedicates a certain amount of server resource and bandwidth for each viewer, the present invention enables a low cost server with limited bandwidth serving an unlimited number of viewers. With a set-top box in accordance with the present invention, viewers can view the television content on a television, in addition to viewing on a computer. In an illustrated embodiment, the set-top box provides an interface between an Internet connection and a television. The video quality provided using the teachings of the invention is equal to or better than that seen on typical digital cable television channels.

The methods, apparatus, and systems of the present invention provide the foregoing and other advantages.

SUMMARY OF THE INVENTION

The present invention relates to broadcasting/multicasting of media content over a communications network using shared bandwidth available from peer-to-peer networking.

The system of the present invention may include a plurality of broadcast devices, a plurality of receiving devices, a plurality of databases, and a control center.

The broadcast device converts real time or non-real time media content, which can be television, radio, and other data received from various content providers, into digital packets having a suitable format for transmission over the Internet. Each receiving device will request/receive the relevant packets, decode the received packets, and display the media content contained in the packets on an associated television or other video appliance or display.

The present invention provides a distributed application-level IP-multicasting (or peer-to-peer) network. Each receiving device on the network not only receives packets for its own consumption, but may also serves packets to be received and used by other receiving devices. This peer-to-peer feature is referred to as Mediashare™ (discussed in detail below), and enables a thin server with limited bandwidth to serve an unlimited number of receiving devices in real time.

The control center is the central nerve of the network, and provides a number of services, including but not limited to:
1. Channel service: provides authorization for a broadcast device to broadcast; creates a channel line up;
2. Guide Service; informs the receiving devices what programs are available on each channel;
3. User service: provides necessary authorization of viewing content;
4. Conditional Access service: dispenses encryption keys for a broadcast device to encrypt its content and decryption keys for the receiving devices to decrypt the encrypted content;
5. Peer service: informs receiving devices where to find their peers;
6. Billing service: creates billing according to user subscription and user behaviors; and
7. Ad service: allows advertising content to be distributed and informs receiving devices when to switch to a commercial and when to switch back.

The present invention encompasses a number of innovations created to enable a television service on such a peer-to-peer platform. These innovations include, without limitation:
1. MediaTorrent™—Enables a channel to carry multiple streams.
2. MediaSwitch™—provides a quick channel/program switch that television viewers are accustomed to.
3. MediaShare™—provides an effective way to share bandwidth among users (peers).
4. MediaCluster™—provides for efficient clustering of the peers for optimum network usage.
5. MediaSplice™—provides for splicing or switching of the video stream for ad insertion.
6. MediaOverlay™/MediaSubaudio™—provides for logo and subtitle overlays, including translations of audio and text from one language into a desired/local language of the receiver.
7. MediaCrypt™—provides content protection demanded by content broadcasters.

In one example embodiment of the present invention, methods and systems are provided for delivering media content over a communications network. One or more servers are provided for delivering media content over the network for one or more media content programs. The media content comprises data packets. A control center is provided for controlling delivery of the media content over the network via the one or more servers. A plurality of receiving devices are provided for receiving the media content. At least a portion of the receiving devices are configured to share resources via the network, enabling the transfer of the data packets from one receiving device to another.

The media content may be reconstructed at the receiving device in real time with data packets received from at least one of: (a) one of the servers; (b) one or more peers on the network; and (c) local memory.

The one or more servers may comprise at least one of: (a) one or more dedicated broadcasting devices; and (b) one or more of the receiving devices. In other words, data packets for a media content program may be provided to a receiving device from a dedicated broadcasting device or anther one of the receiving devices.

The MediaSwitch component of the present invention enables a program switch from a first program to a second program. For example, a first receiving device may be receiving data packets for a first media content program. The first receiving device is enabled to switch to a second media content program by receiving data packets for the second media content program from at least one of: (a) one of the one or more servers; and (b) at least one other of the receiving devices currently receiving data packets for the second media content program.

The data packets initially received for the second media content program during a program switch may comprise one or more anchor frames for the second media content program. Alternatively, the data packets initially received for the second media content program during a program switch may comprise one or more anchor frame and corresponding audio data for the second media content program. The one or more anchor frames are received for the second media content program until the first receiving device has sufficient bandwidth to receive data packets containing additional anchor frames and other types of frames.

In a further example embodiment, a peer service is provided which is associated with the control center for defining a subset of the receiving devices that comprise peers on the network. The transfer of the data packets is enabled from one peer to another peer.

In such an example embodiment, the MediaSwitch component of the present invention may enable a program switch using data packets obtained from peers on the network. For example, a first receiving device may be receiving data packets for a first media content program. The first receiving device processes a program switch from the first media content program to a second media content program. Data packets for the second media content program are provided to the first receiving device from at least one of: (a) one of the one or more servers; and (b) at least one of the peers on the network.

A request for the program switch may be communicated from the first receiving device to the peer service. The peer service may provide to the first receiving device a list of available peers on the network that are currently receiving the data packets for the second media content program. During processing of the program switch, the first receiving device may communicate a request for the data packets for the second media content program to one or more of the available peers from the list. The request for data packets may comprise a request for anchor frames from the second media content program.

A number of anchor frames may be stored at each receiving device for enabling the program switch. The request may include a request for an initial anchor frame closest to a display time of the receiving device. The initial anchor frame may be an anchor frame with a time-stamp closest to a time t plus a current time. The time t may comprise one of a positive number, a negative number, and zero.

The initial anchor frame may be received, decoded, and displayed at the first receiving device regardless of a time stamp for the initial anchor frame. The first receiving device may begin receiving additional anchor frames after the initial anchor frame is received. The additional anchor frames may be received from one or more of the peers until the first receiving device has sufficient bandwidth to accept data packets containing additional anchor frames and other types of frame.

The first receiving device may communicate a stop command to the server providing the data packets for the first media content program after the program switch is processed.

The one or more servers may segregate the media content into groups of data packets according to priority, including at least a high priority group of data packets and a low priority group of data packets. The high priority group of data packets for the second media content program are provided to the first receiving device to enable the program switch. The high priority group of data packets may comprise anchor frames and associated audio packets, and the lower priority group of data packets may comprise non-anchor frames and associated audio packets.

The media content may comprise at least one of prerecorded media content or real-time media content. The media content may comprise at least one of television programs, news programs, movies, concerts, sports programs, radio programs, advertising content, television commercials, radio commercials, and the like.

BRIEF DESCRIPTION OF THE DRAWINGS

The present invention will hereinafter be described in conjunction with the appended drawing figures, wherein like reference numerals denote like elements, and.

DETAILED DESCRIPTION

The ensuing detailed description provides exemplary embodiments only, and is not intended to limit the scope, applicability, or configuration of the invention. Rather, the ensuing detailed description of the exemplary embodiments will provide those skilled in the art with an enabling description for implementing an embodiment of the invention. It should be understood that various changes may be made in the function and arrangement of elements without departing from the spirit and scope of the invention as set forth in the appended claims.

Figure 1:
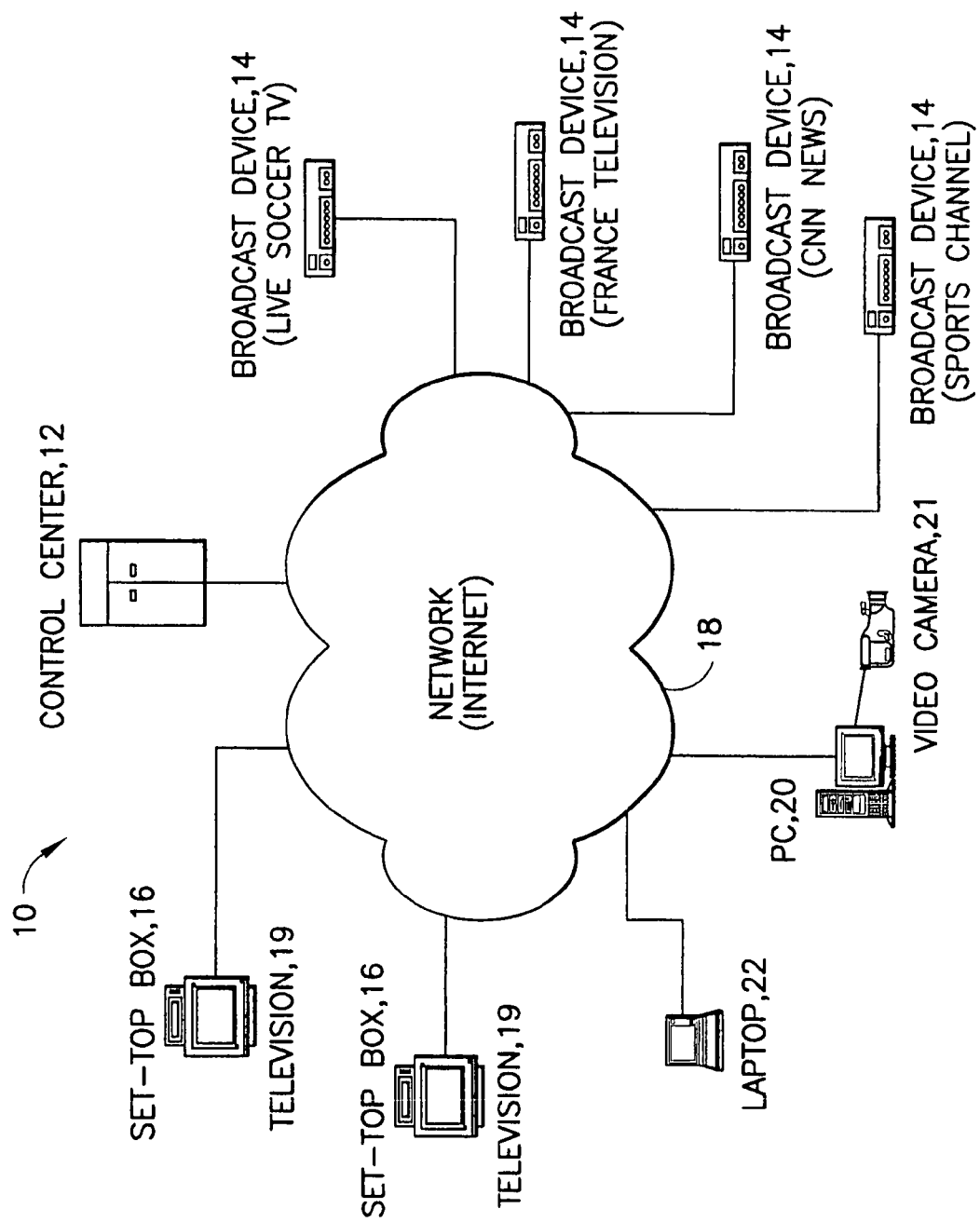
FIG. 1 is a block diagram of an example system embodiment in accordance with the present invention.

FIG. 1 shows an example embodiment of a system 10 in accordance with the present invention. The system includes a control center 12, a plurality of broadcast devices/encoders 14, a plurality of receiving devices (e.g., set-top boxes) 16, and a network 18 (e.g., the Internet or other global communications network). In addition, software may be provided to enable a PC 20 or a laptop 22 to act as a receiving device for receiving content from the network or as a broadcast device for providing content to the network (e.g., via video camera 21).

Although example embodiments of the present invention are described in connection with delivery of television services over the Internet, it should be appreciated that the present invention can be adapted for use with any type of media content on any type of communications network. For example, the network 18 may be a local area network (LAN), metropolitan area network (MAN), a wide area network (WAN), an intranet, and a global area network, or combinations thereof.

As shown in FIG. 1, each broadcast device 14 may be associated with a different content provider, such as CNN, France Television, Live Soccer TV, or the like.

Figure 2:
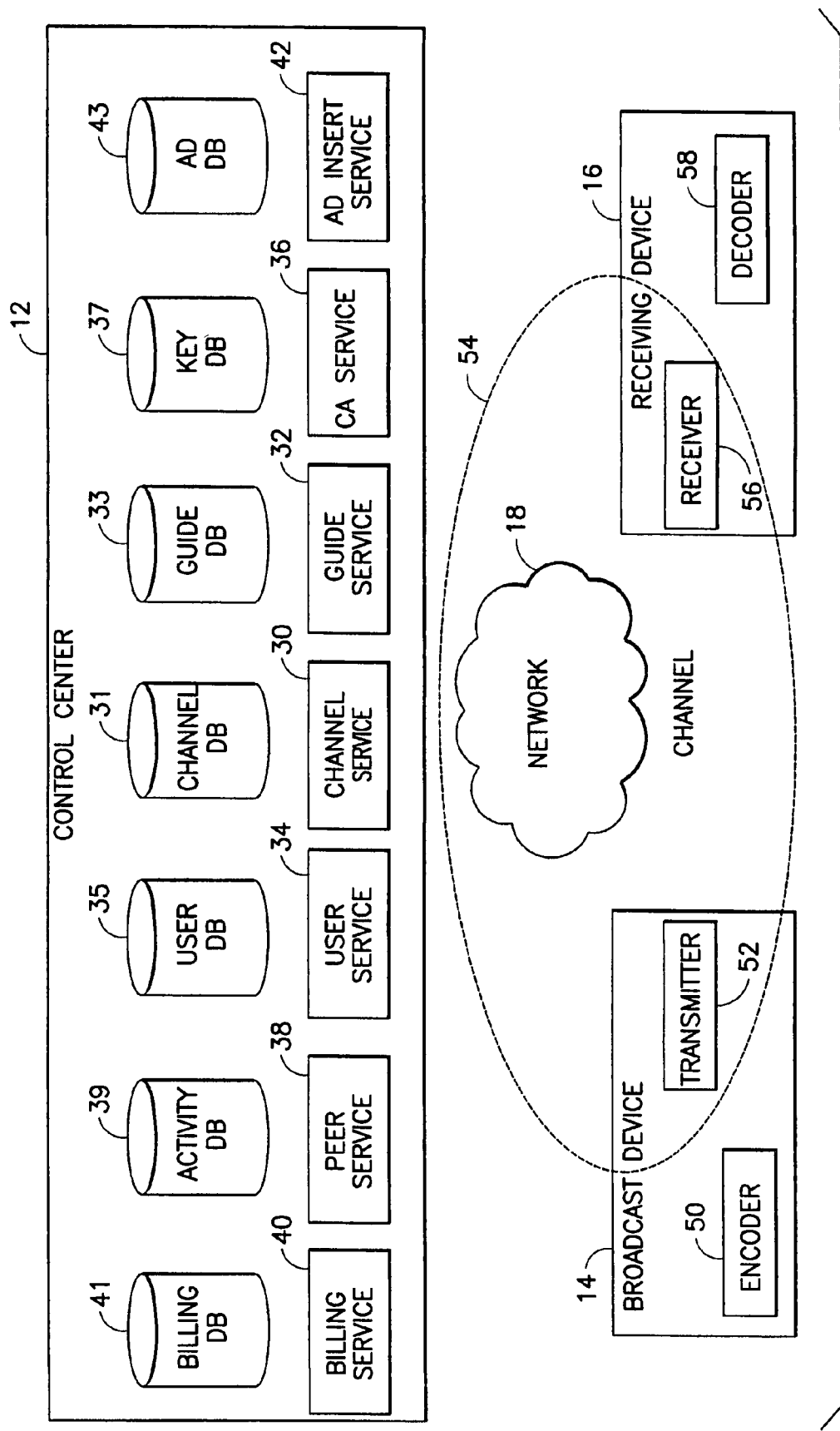
FIG. 2 is a block diagram of a further example system embodiment in accordance with the present invention.

As shown in FIG. 2, the control center 12 can provide various services, including, for example, a channel service 30, which provides authorization for a broadcast device 14 to broadcast and creates a channel line up; a guide service 32, which informs the receiving devices 16 what available channels/programs are present on the network; a user service 34, which provides necessary authorization of viewing content; a conditional access ("CA") service 36, which dispenses encryption keys for the broadcast devices 14 to encrypt their content and decryption keys for the receiving devices 16 to decrypt the encrypted content; a peer service 38, which informs receiving devices 16 where to find their peers on the network 18; a billing service 40, which creates billing according to user subscription and user behaviors; and an ad inserting service 42, which allows advertising content to be distributed and informs receiving devices 16 when to switch to a commercial and when to switch back to a regular program or service.

Each of the foregoing services may have an associated database for storing relevant information used by that service. For example, the channel service 30 may have an associated channel database 31 for storing records relating to available programs and corresponding channels on the network and channel lineups; the guide service 32 may have an associated guide database 33 for storing information used to create the program guides and the guides themselves; the user service 34 may have an associated user database 35 for storing records associated with each user, including authorization information; the conditional access service 36 may have an associated key database 37 for storing the encryption and decryption keys; the peer service 38 may have an associated activity database 39 for storing records relating to the activity of each user; the billing service 40 may have an associated billing service database 41 for storing records relating to billing of users; and the ad service 42 may have an associated ad database 43 for storing advertisements, messages, public service announcements and the like to be inserted into the content. Those skilled in the art will appreciate that, although the databases are shown as part of the control center 12 in FIG. 2, one or more of these databases may be located remote from the control center 12 and connected thereto via the network 18.

The broadcast device 14 may comprise an encoder 50 for encoding the content provided by the content provider and a transmitter 52 for transmitting the encoded content over the network 18 via a particular channel 54. The channel 54 may be assigned by the channel service 30.

The receiving device 16 may comprise a receiver 56 for receiving the content from the network 18 on a particular channel 54 and a decoder 58 for decoding the content for display on an associated television or other video appliance or display 19, a laptop 22, or a PC 20 (FIG. 1). It should be appreciated that any receiving device 16 may also include the functionality of the broadcast device 14 (e.g., an encoder 50 and transmitter 52) to enable the receiving device 16 to act as a broadcast device 14 to enable transfer of data packets among peers on the network.

In one example embodiment of the present invention, methods and systems are provided for delivering media content over a communications network (e.g., network 18). One or more servers are provided for delivering media content over the network 18 for one or more media content programs. The one or more servers may comprise at least one of: (a) one or more dedicated broadcasting devices 14; and (b) one or more of the receiving devices 16. In other words, data packets for a media content program may be provided to a receiving device from a dedicated broadcasting device or anther one of the receiving devices.

The media content comprises data packets. A control center 12 is provided for controlling delivery of the media content over the network 18 via the one or more servers. A plurality of receiving devices 16 are provided for receiving the media content. At least a portion of the receiving devices 16 are configured to share resources via the network 18, enabling the transfer of the data packets from one receiving device to another. This transfer of packets from one receiving device 16 to another is discussed in detail below in connection with the MediaShare feature of the present invention.

The media content may be reconstructed at the receiving device in real time with data packets received from at least one of: (a) one of the servers; (b) one or more peers on the network; and (c) local memory.

MediaTorrent™

The MediaTorrent™ feature uses IP multicasting to deliver data packets to as many receiving devices as possible, and uses the peer-to-peer network to find and deliver missing packets. The server (e.g., broadcasting device 14 or a server associated therewith) will provide the IP multicasting information and tracking information to all the receiving devices 16 requesting the media content. All the receiving devices 16 will attempt to subscribe to the IP multicasting channel identified in the multicasting information. Any receiving devices 16 that fail to connect to the IP multicasting channel will use the tracking information to obtain the media content, or missing packets thereof, from peers connected to the network 18 (other receiving devices 16) that have been able to connect to the IP multicasting channel. The media content may be segregated into multiple independent groups. Each group may be assigned a different priority. The receiving device will attempt to first receive the packets that are assigned a higher priority.

In an example embodiment, at least some of the receiving devices 16 are able to create a new IP multicasting channel and to send out all the information received at that receiving device 16 to other receiving devices via the network 18.
MediaSwitch™

The MediaSwitch™ feature of the present invention provides users with the ability to make a quick program switch in an IP environment. One of the challenges in implementing a broadcast television system over the Internet or other type of network is to enable a user to quickly switch from one program to another as can be done with traditional television services. Normally, in an IP environment, a certain amount of content, say T seconds, is buffered at the receiver in response to a request for that content. This often means that the decoder will not show the content until T seconds later.

The MediaSwitch™ feature allows a decoder to intelligently request proper data packets for the new program from its peers in the network. With the available bandwidth and peers' support, the first frame for a new program (and associated audio data) can be provided to the receiving device within 100 ms. This enables a user to quickly switch to a new program, avoiding the delays associated with a typical prior art IP environment. The basic idea behind the MediaSwitch™ feature is that video data can be separated into an anchor frame and other frames. An anchor frame (e.g., an I-Frame in the MPEG format) is a frame that can be decoded without needing information from other frames.

In an example embodiment of the MediaSwitch feature in accordance with the present invention, a first receiving device 16 may be receiving data packets for a first media content program. The first receiving device 16 is enabled to switch to a second media content program by receiving data packets for a second media content program from at least one of: (a) one of the one or more servers 14; and (b) at least one other of the receiving devices 16 currently receiving data packets for the second media content program.

The data packets initially received for the second media content program during a program switch may comprise one or more anchor frames for the second media content program. Alternatively, the data packets initially received for the second media content program during a program switch may comprise one or more anchor frames and corresponding audio data for the second media content program. The one or more anchor frames may be received for the second media content program until the first receiving device 16 has sufficient bandwidth to receive data packets containing additional anchor frames and other types of frames.

In a further example embodiment, a peer service 38 is provided which is associated with the control center 12 for defining a subset of the receiving devices 16 that comprise peers on the network 18. The transfer of the data packets is enabled between the peers.

In such an example embodiment, the MediaSwitch component of the present invention may enable a program switch using data packets obtained from peers on the network 18. For example, a first receiving device 16 may be receiving data packets for a first media content program. The first receiving device 16 processes a program switch from the first media content program to a second media content program. Data packets for the second media content program are provided to the first receiving device 16 from at least one of: (a) one of the one or more servers (e.g., broadcast devices 14 or other receiving device 16 acting as a server); and (b) at least one of the peers (e.g., other receiving devices 16 on the network 18).

A request for the program switch may be communicated from the first receiving device 16 to the peer service 38. The peer service 38 may provide to the first receiving device 16 a list of available peers on the network 18 that are currently receiving the data packets for the second media content program. During processing of the program switch, the first receiving device 16 may communicate a request for the data packets for the second media content program to one or more of the available peers from the list (any other receiving device 16 identified by the peer service 38 as a peer that is receiving the second media content program).

The request for data packets may comprise a request for anchor frames from the second media content program. The request may include a request for an initial anchor frame closest to a display time of the receiving device 16. The initial anchor frame may be an anchor frame with a time-stamp closest to a time t plus a current time. The time t may comprise one of a positive number, a negative number, and zero.

The initial anchor frame may be received, decoded, and displayed at the first receiving device 16 regardless of a time stamp for the initial anchor frame. The first receiving device 16 may begin receiving additional anchor frames after the initial anchor frame is received. The additional anchor frames may be received from one or more of the peers until the first receiving device 16 has sufficient bandwidth to accept data packets containing additional anchor frames and other types of frame.

The first receiving device 16 may communicate a stop command to the server providing the data packets for the first media content program after the program switch is processed.

The media content may comprise at least one of prerecorded media content or real-time media content. The media content may comprise at least one of television programs, news programs, movies, concerts, sports programs, radio programs, advertising content, television commercials, radio commercials, and the like.

Figure 3:
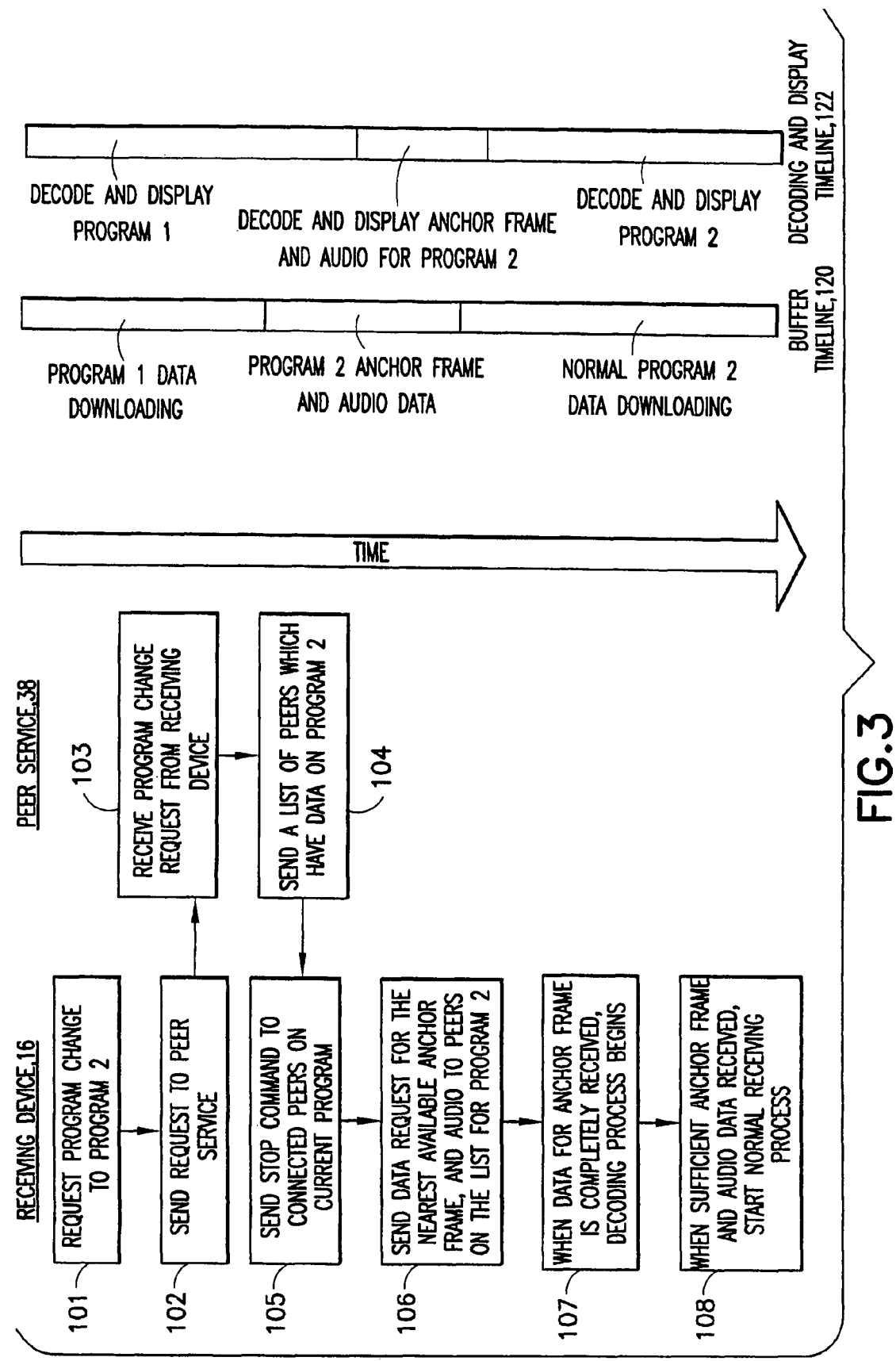
FIG. 3 is a flowchart of an example embodiment of the MediasSwitch™ feature in accordance with the present invention.

FIG. 3 is a flow diagram of an example embodiment of the MediaSwitch™ process. The receiving device 16 may be receiving/downloading data packets for a first media content program when it receives a request to switch to a second media content program (step 101). The receiving device 16 may be receiving data packets for the first media content program from either the broadcast device 14 or connected peers (other receiving devices 16) that are also receiving the first media content program. Once a program change request is received, the receiving device 16 may request the first available anchor frame and audio data (step 102) from peers (other receiving devices 16) which are tuned to the channel that decoder is switching into. Optionally the data packets for the second media content program may be received from a server 14. The request may be processed by peer service 38 at control center 12 (FIG. 2). The peer service 38 receives the program change request (step 103) and sends a list of peers which have data from the second media content program to the receiving device 16 (step 104). The receiving device 16 may then send a STOP command to currently connected peers and/or servers 14 (step 105) in order to stop peers and/or servers 14 from providing the data packets for the first media content program to the receiving device 16 (since the receiving device 16 is switching away from the first media content program). It should be noted that stop commands can be issued at any time, from the moment of receiving the channel switch and onwards.

The receiving device 16 may then send a request (step 106) for an anchor frame, which can be the nearest available anchor frame for the display time, and associated audio data to peers on the list provided by the peer service 38 (step 104). When the receiving device 16 completely receives the first requested anchor frame data, it may then be decoded (step 107) and displayed regardless of its time stamp set by the broadcast equipment. Associated audio data may be decoded according to its time stamp. The receiving device 16 may continue to receive subsequent anchor frames and audio data, until the receiving device 16 has extra bandwidth for additional anchor frames and other types of frames (e.g., B and P frames in the MPEG format) at which time the normal receiving process will resume (step 108).

The right side of FIG. 3 shows the buffer timeline 120 of the receiving device 16 during the switch from the first media content program (Program 1) to a second media content program (Program 2), and the decoding and display timeline 122 of the buffered data at receiving device 16.

With the MediaSwitch™ feature, the server (e.g., broadcast device 14, a server associated with the broadcast device 14, or a peer on the network) may segregate the media content into groups of data packets according to priority, including at least a high priority group of data packets and a low priority group of data packets. During channel switching, the receiving device 16 has the first priority of requesting data from the high priority group or groups of content to enable the program switch. The decoder 58 of the receiving device 16 will decode data from the high priority group/groups received from a server 14 or peers receiving the second media content program that the receiving device 16 is switching to. Once the receiving device 16 receives sufficient priority group/groups of data, the receiving device 16 may start to receive other group/groups of data from the peers or a server 14. Once there are sufficient data, the receiving device 16 will resume the normal receiving operation. The groups may include audio, video anchor frames, and other video frames (P and B frames). The high priority groups of data packets may comprise video anchor frames and associated audio content. The lower priority groups of data packets may comprise non-anchor frames and associated audio packets.

To ensure that other peers can do a quick channel switch, a number n of anchor frames are kept in memory at each receiving device 16, even though these frames may have already been decoded and displayed by that receiving device 16. For example, each receiving device 16 may be capable of buffering 100 seconds of video or more. Depending on the video format (e.g., MPEG-2 or MPEG-4), the buffer of the receiving device 16 may cache approximately 20-200 anchor frames.

It should be appreciated although the foregoing description of the MediaSwitch feature is described in connection with facilitating a program change in an IP environment, the terms "first media content program" and "second media content program" should be understood to include any type of media content, including but not limited to live or prerecorded television programs, news programs, movies, concerts, sports programs, radio programs, advertising content, television commercials, radio commercials, and the like. Thus, for example, the MediaSwitch feature may enable not only a switch from one program or type of content to another, but also a switch from a program to a commercial or vice versa.

MediaShare™

Figure 4:
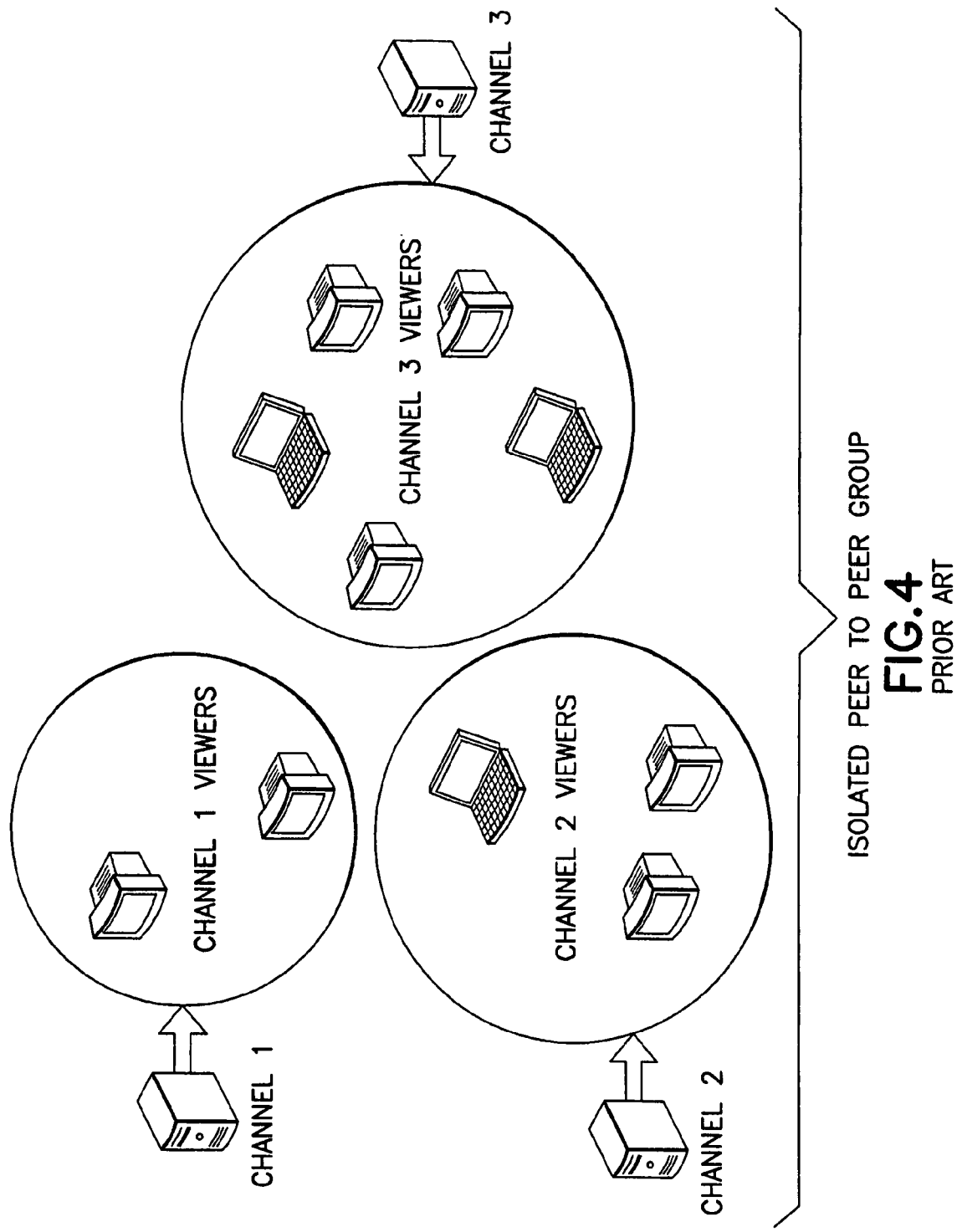
FIG. 4 is a block diagram of a prior art isolated peer-to-peer network.
Figure 5:
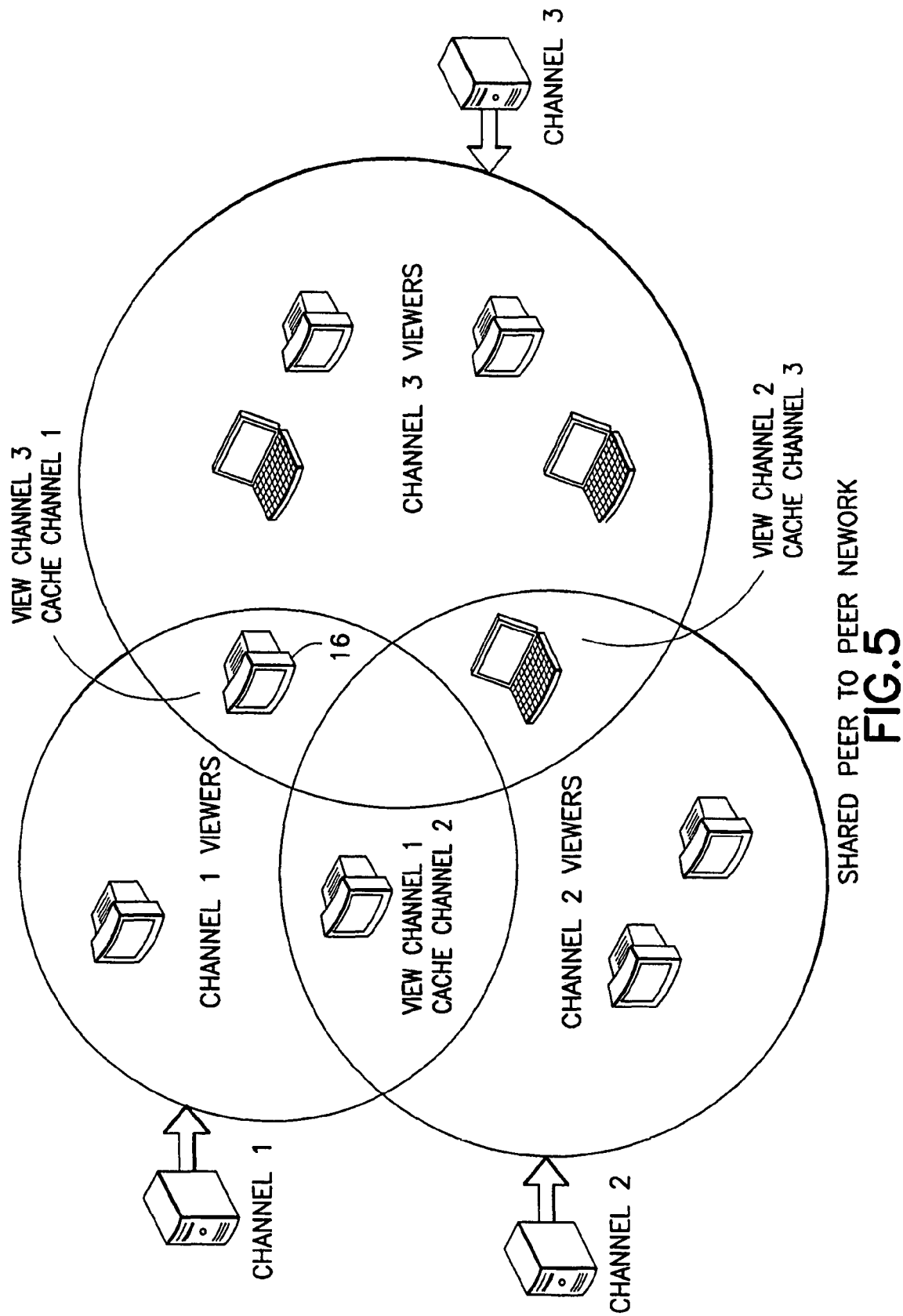
FIG. 5 is a block diagram of an example embodiment of a shared peer-to-peer network in accordance with the present invention.

The MediaShare™ feature enables receiving devices to share bandwidth. In a typical prior art peer-to-peer network as shown in FIG. 4, a group of users who share the same file or media stream form a swamp. The resources are isolated within the group that shares the same file or media stream. As shown in FIG. 5, the MediaShare™ feature of the present invention enables any peer to be able to participate in one or more swamps. Accordingly, all the resources on the peer-to-peer network can be shared among various swamps.

In ADSL and cable modem environments, the upload and download bandwidth are often asymmetric. In an isolated swamp as shown in FIG. 4, the imbalance among the peers will be the burden of the primary server. For example, if the stream rate is 1 Mbps, and the download bandwidth for all the peers is 1.5 Mbps and the upload bandwidth for all the peers is 0.5 Mbps, and the swamp has four peers, there will be an imbalance between the stream rate and the download capabilities of the peers in the network.

With the MediaShare™ feature of the present invention, the availability of real-time media content for upload into the peer-to-peer network is increased. Each peer in the network with extra resources will be capable of passively participating in other swamps, in order to fully utilize the available resources of the network.

In an example embodiment according to the present invention, a receiving device 16 in the peer-to-peer network (FIG. 5) is receiving and displaying one program (e.g., on channel 3). The receiving device 16 checks its current upload speed versus its available upload capacity. If the receiving device 16 has available capacity, it will select another program to receive from a list of programs that are participating on the network. The receiving device will then download the media content from another receiving device or server (e.g., on channel 1) that is participating on the selected program. The receiving device 16 will then make itself available to other receiving devices on the network so that those other receivers can download either program from it.

The program data may comprise real-time audio and/or video program data. The list of programs may be all the programs available on the network. The list of programs may comprise selected programs that target a specific geographic region. The process of selecting another program by the receiving device 16 may be a random selection process. Alternatively, the process of selecting another program by the receiving device 16 may comprise selecting the program that has the least number of participants.

In order to assure that the data rate of the swamp that the receiving device 16 is primarily associated with is not affected by that receiving device supporting other swamps, the download speed for data from other swamps may be limited to a specific rate. For example, the receiving device 16 may download the selected program from another swamp at a rate which is equal to or less than half of its available upload capacity.

The receiving device 16 may be actively participating in one swamp by, for example, receiving and viewing a television program. This receiving device (peer) may then be requested to passively participate in another particular swamp or swamps on the network by downloading program information for that swamp or swamps. This request may come from other peers on the network 18, from a broadcast device 14 or associated server, from the control center 12 (e.g., via Peer Service 38), or be generated by that receiving device 16 itself.

Figure 6:
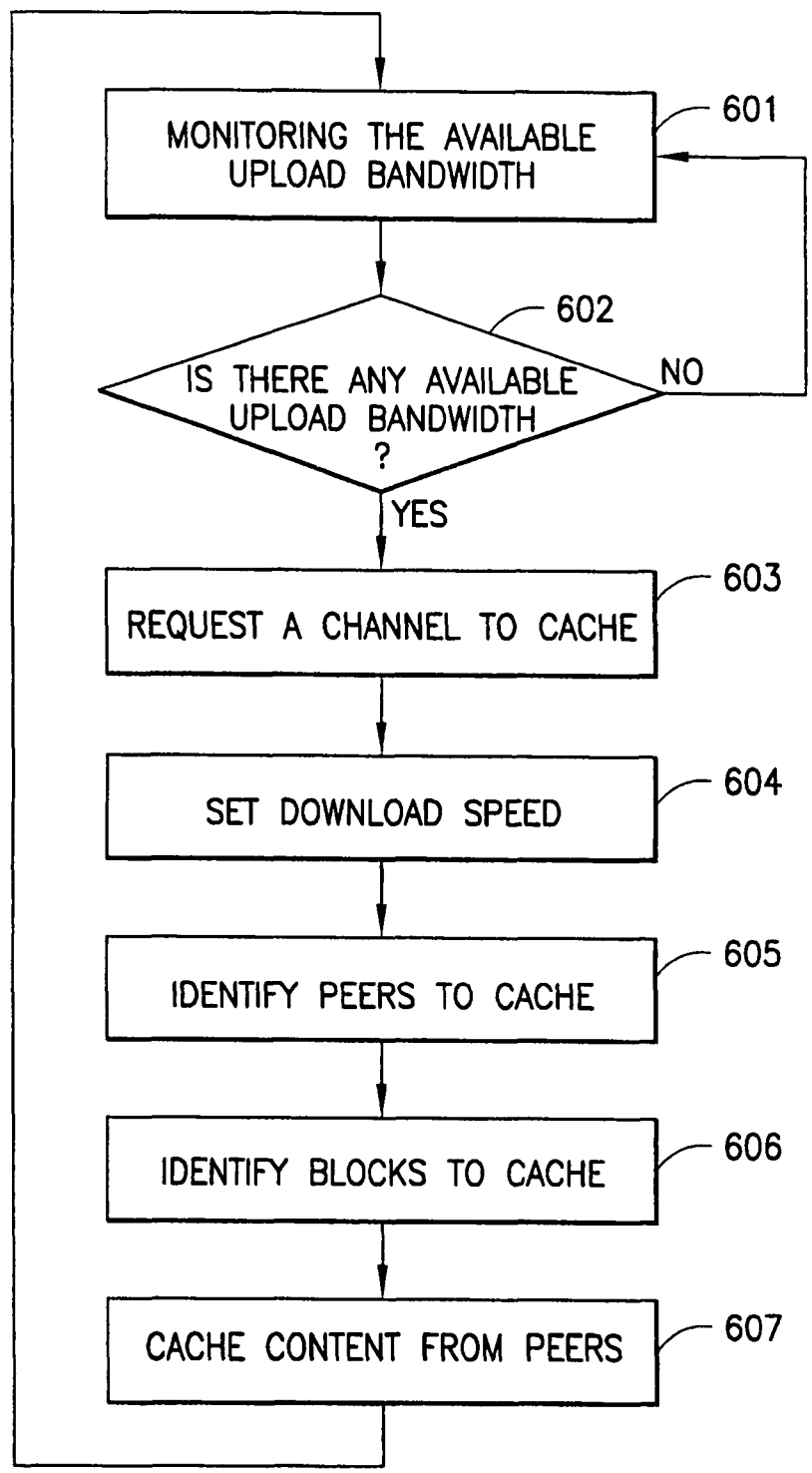
FIG. 6 is a flowchart of an example embodiment of the MediaShare™ feature in accordance with the present invention.

FIG. 6 is a flowchart illustrating the control of the available network bandwidth provided by the MediaShare™ feature of the present invention. This control may be implemented by a server or associated broadcast device 14 which serves a particular swamp or swamps, or by the Peer Service 38 at the control center 12. The server or the Peer Service 38 ("controller") monitors the available upload bandwidth on the network (step 601). Once a determination has been made that there is available upload bandwidth on the network (step 602), the controller will request a particular channel to be cached (step 603). The download speed for this request will be set by the controller (step 604). The controller will then identify peers on the network that have available resources to cache blocks or packets of the channel data (step 605). The controller will also identify the blocks or data packets to be cached (step 606). The content will be stored at the peers and available for upload by other peers on the network (step 607).

Different levels of service may be provided for in connection with the MediaShare™ service. For example, a free level of service may enable peers to contribute bandwidth for use on the network. A pay level of service may enable a peer to move bandwidth, for example to request a program from another peer in the network, or to provide content to another peer in the network. A subscription level of service may enable balancing and sharing of bandwidth usage on the network as needed. Other levels of service may also be provided which include combined or modified features of the foregoing levels.

MediaCluster™

The MediaCluster™ feature provides for efficient clustering of the peers to enable optimum network usage. Each user is grouped according to its IP address. Each of the groups reflect a network (or swamp) which the group belongs to. The peer service 38 will forward to each peer in the network a list identifying peers that belong to the same group, as well as identifying a few peers from other groups. The receiving device 16 will limit the number of connections to peers in other groups to those peers identified by the peer service 38. MediaCluster enables sharing of resources mainly between peers connected within the same group, but does also permit limited sharing of resources outside of that group, enabling optimum usage of network resources.

MediaSplice™

Figure 7:
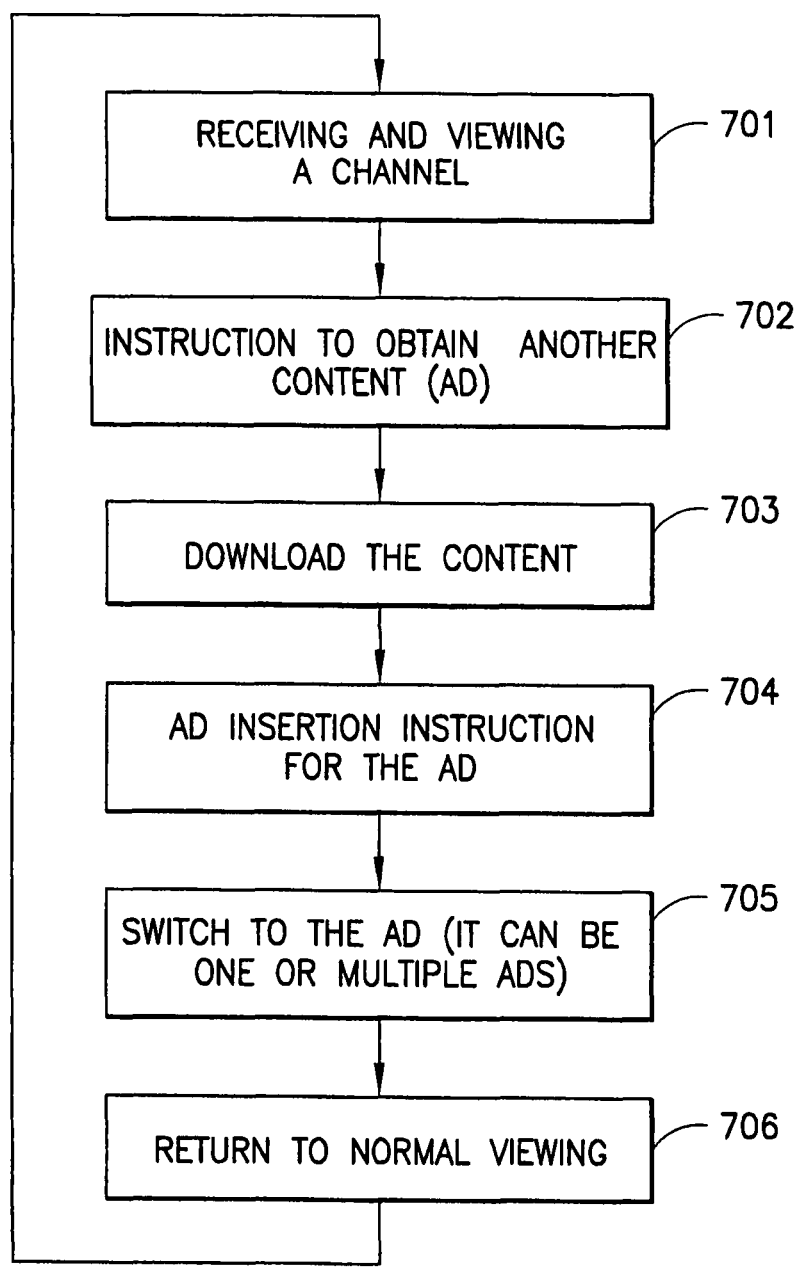
FIG. 7 is a flowchart of an example embodiment of the MediasSplice™ feature in accordance with the present invention.

The MediaSplice™ feature of the present invention provides for splicing of the video stream for insertion of an advertisement. As shown in FIG. 7, MediaSplice™ enables the seamless insertion of a commercial into a compressed digital television stream without touching the compressed video stream. The subscriber's viewing behavior is recorded and categorized during normal channel viewing (step 701). When a commercial spot is approaching, the receiving device 16 will receive instructions (e.g., from the Ad Service 42 of the control center 12) that identify the corresponding data packets for the commercial which is designated for that specific class of viewer and that time slot (step 702). The receiving device 16 will download the corresponding packets from a content or ad server, or from a peer in the network (step 703). Alternatively, the ad or ads may be stored at the receiving device 16. The receiving device will then receive instructions (e.g., from the Ad Service 42 of the control center 12) for inserting the ad (step 704). It will then splice the commercial into the video stream at the corresponding spot by switching to the ad content (step 705) at the designated time. Switching to the ad content may be accomplished in a manner similar to the switch to a different program as discussed above in connection with the MediaSwitch feature of the present invention. When the commercial(s) are completed, the receiving device will return to (switch back to) normal viewing of the program (step 706) and wait for the next instruction for ad insertion.

Each receiving device 16 may store advertising content locally or obtain the advertising content from an ad server (e.g., advertising service 43 and advertising database 44), from a content provider, or from another peer in the network.

MediaOverlay™/MediaSubaudio™

The MediaOverlay™ feature of the present invention enables multiple subtitles on a single television program, and allows any entity to create a subtitle channel independent of the main television program. In addition, MediaOverlay™ enables the subtitle channel to be broadcast independently of the main television program, while being able to be displayed in sync with the main television program. The MediaOverlay™ process involves a translation service which associates a subtitle with one specific television channel and/or program. This service will be selectable by viewer. The independent subtitle data carries the necessary timing information which allows it to be synced with the associated television program at the receiving device 16.

The MediaSubaudio™ feature of the present invention enables multiple subaudio channels on a single television program, and allows any entity create a subaudio channel independent of the main television program. The subaudio channel may be broadcast independent of the main television program, yet in sync with the main television program. This feature enables language translations of the audio so that viewers can listen to any program in a desired language.

Figure 8:
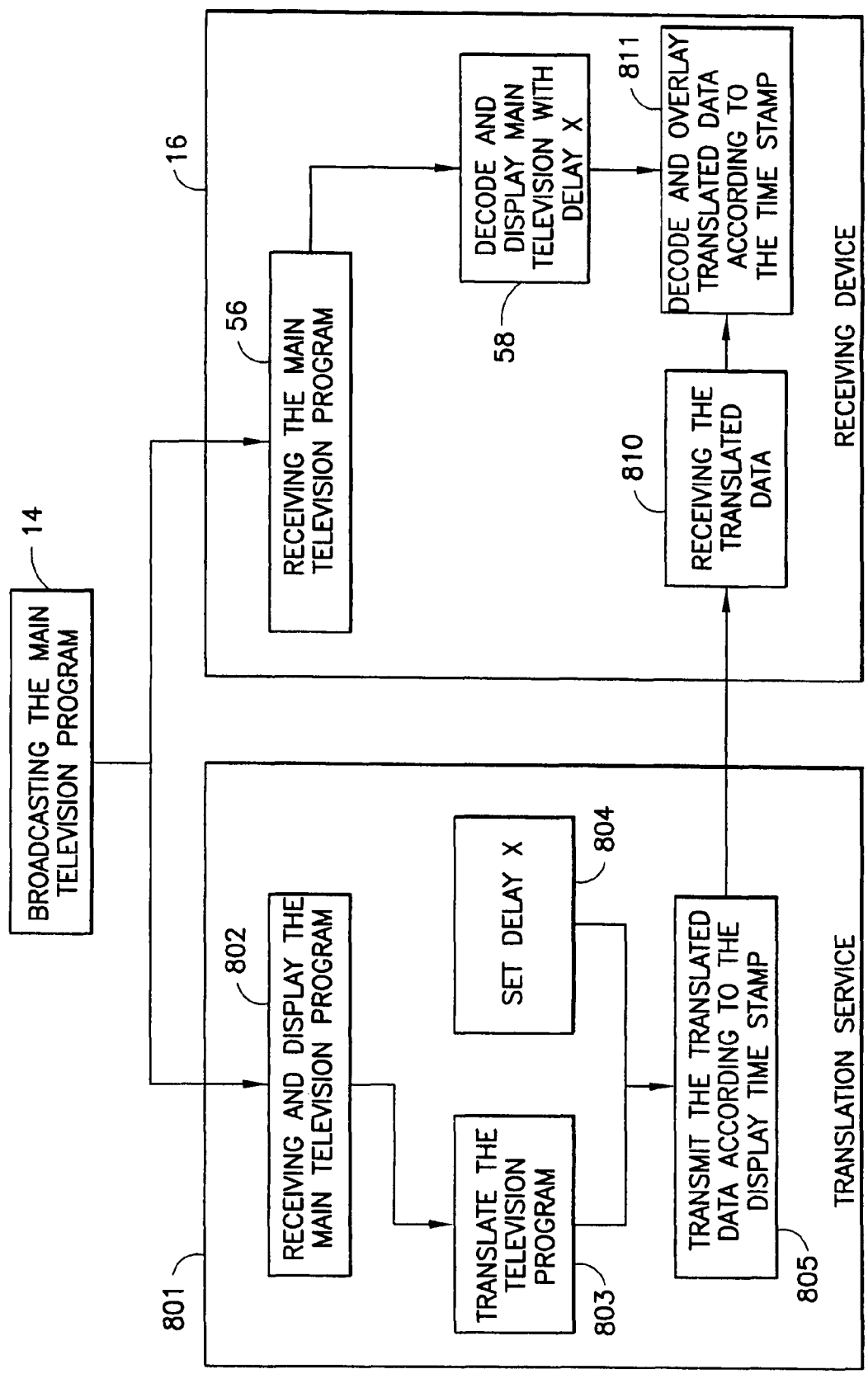
FIG. 8 is a block diagram of an example embodiment of the MediaOverlay™ and MediaSubaudio™ features in accordance with the present invention.

FIG. 8 shows a block diagram of an example embodiment of the MediaOverlay™ and MediaSubaudio™ features. At least some of the receiving devices 16 may have a translation service 801 associated therewith which can be selected by the viewer. The receiving device 16 receives the main television program from the server 14 at receiver 56. The decoder 58 decodes and displays the main television program with a delay x. At the same time, the translation service 801 receives and displays the main television program at receiver/decoder 802. A translation agent 803 (which may be a computer program for translation of audio or text, or a human agent manually translating audio or text and entering such translated data into a database) prepares a translation of the audio and/or original subtitles into the desired language selected by the user. If the main television program does not include any original subtitle text, the audio may be translated to generate subtitles in the desired language. A delay x is set at delay 804 of the translation service 801. The translated data, which may be either translated audio or translated subtitles (or both) is then transmitted to the receiving device 16 via transmitter 805. The receiving device 16 receives the translated data at receiver 810. At the receiving device, the received translated data is decoded and synchronized with the main television program according to the time stamp at decode device 811.

Figure 9:
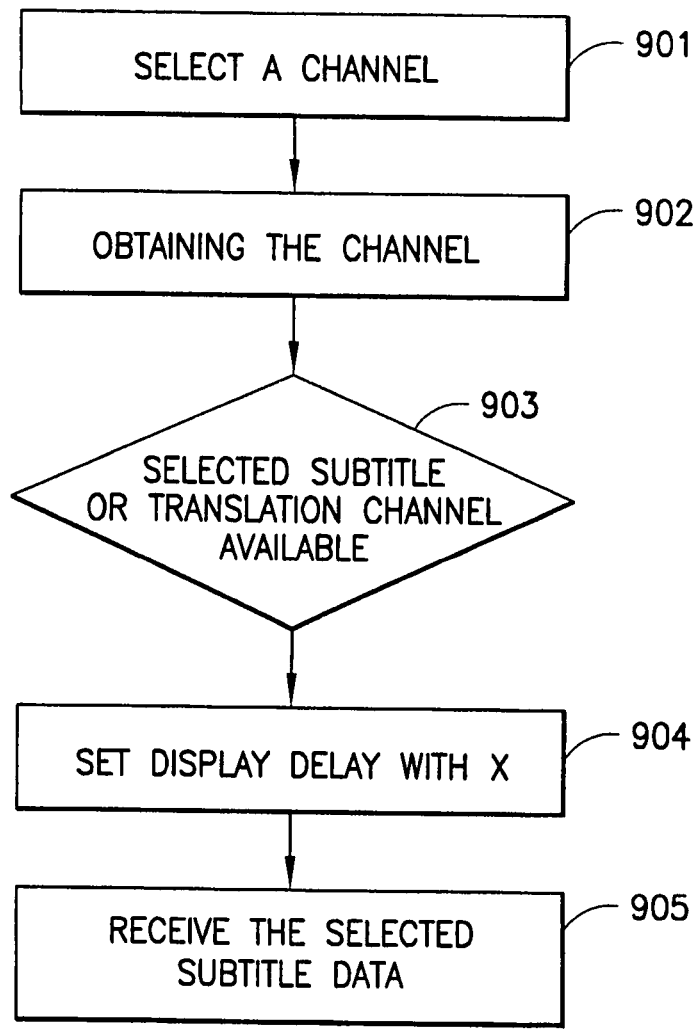
FIG. 9 is a flowchart of an example embodiment of the MediaOverlay™ and MediaSubaudio™ processes in accordance with the present invention.

FIG. 9 is a flowchart of an example embodiment of the MediaOverlay™ and MediaSubaudio™ processes in accordance with the present invention. The user selects a channel (step 901). The receiving device 16 obtains the channel (step 902). The user then selects an available subtitle channel or translation channel for audio and/or subtitle text in a desired language (step 903). A delay x is set at the receiving device (step 904). The selected subtitle data and/or audio translation data is then received, decoded and synchronized with the television program on the selected channel, and overlaid with the main video display of that channel (in the case of translated subtitles) or substituted for the original audio of the main television program (in the case of translated audio) (step 905).

MediaCrypt™

The MediaCrypt feature of the present invention provides content protection demanded by content broadcasters. The video packets for anchor frames are encrypted with a common key. The common keys are further encrypted for a specific receiving device 16. The encrypted key then is delivered to the corresponding receiving device 16. The receiving device 16 will decrypt the received anchor frames and combine the decrypted anchor frames with the rest of the received video frames to reconstruct the compressed video stream. The reconstructed compressed video stream can then be decoded within the receiving device 16.

It should now be appreciated that the present invention provides advantageous methods, apparatus, and systems for delivering media content, such as broadcast television services, over the Internet using shared bandwidth available from peer-to-peer networking. A broadcast device is provided, together with a plurality of receiving devices, a plurality of databases, and a control center. The control center provides a number of services, including but not limited to channel control, ad insertion, conditional access, and program guide services. The broadcast device converts real time or non-real time media content, which can be television, radio, and other data received from various content providers, into digital packets. The packets are configured for transmission over a global communications network, such as the Internet. Each receiving device will request the relevant packets for a desired program or service, decode the received packets, and display the media content contained in the packets on an associated television or other video appliance or display. Packets may be received directly from the broadcast devices or from peers (other receiving devices) on the network.

Although the invention has been described in connection with various illustrated embodiments, numerous modifications and adaptations may be made thereto without departing from the spirit and scope of the invention as set forth in the claims.

What is claimed is:

1. A system for delivering real-time media content over a communications network, comprising:
   one or more dedicated servers for temporarily caching data packets of real-time media content for one or more media content programs and for providing tracking information for said data packets;
   a control center for storing identification information for said one or more dedicated servers; and
   a plurality of receiving devices each adapted to: (i) receive said tracking information from said one or more dedicated servers and other of said plurality of receiving devices; (ii) push without request said tracking information to said other of said plurality of receiving devices; and (iii) request and download said cached data packets over the communications network for a requested media content program from (a) said one or more dedicated servers, and (b) at least one other of said plurality of receiving devices, based on at least two of: said identification information obtained from said control center; said tracking information obtained from said one or more dedicated servers; and said tracking information obtained from said other of said plurality of receiving devices;
   wherein:
   at least a portion of said receiving devices are configured to share resources via the communications network, enabling a download of said data packets by one receiving device from another receiving device;
   a first receiving device is downloading data packets for a first media content program; and
   said first receiving device is enabled to switch to a second media content program by requesting and downloading data packets for said second media content program from at least one other of said receiving devices currently downloading or caching data packets for said second media content program.

2. A system in accordance with claim 1, wherein:
   the real-time media content is reconstructed at the receiving device in real time with data packets from at least one of: (a) one of said dedicated servers; (b) one or more peer receiving devices on the communications network; and (c) local memory.

3. A system in accordance with claim 1, wherein:
   said first receiving device is further enabled to switch to the second media content program by also requesting and downloading the data packets for said second media content program from said one or more dedicated servers.

4. A system in accordance with claim 1, wherein:
   said data packets initially downloaded for said second media content program comprise one or more anchor frames for said second media content program.

5. A system in accordance with claim 4, wherein:
   said one or more anchor frames are downloaded for said second media content program until said first receiving device has sufficient bandwidth to download data packets containing additional anchor frames and other types of frames.

6. A system in accordance with claim 1, wherein:
   said data packets initially downloaded for said second media content program comprise one or more anchor frames and corresponding audio data for said second media content program.

7. A system in accordance with claim 6, wherein:
   said one or more anchor frames are downloaded for said second media content program until said first receiving device has sufficient bandwidth to download data packets containing additional anchor frames and other types of frames.

8. A system in accordance with claim 1, wherein:
   said one or more dedicated servers comprise at least one of: (a) one or more dedicated broadcasting devices; and (b) one or more of said receiving devices.

9. A system in accordance with claim 1, further comprising:
   a peer service associated with said control center for defining a subset of said receiving devices that comprise peers on the communications network;
   wherein said download of said data packets is enabled from one peer to another peer.

10. A system in accordance with claim 9, wherein:
    said first receiving device processes a program switch from said first media content program to the second media content program prior to downloading the data packets for the second media content program.

11. A system in accordance with claim 10, wherein:
    a request for said program switch is communicated from said first receiving device to said peer service; and
    said peer service provides to said first receiving device a list of available peers on the communications network currently downloading or caching said data packets for said second media content program.

12. A system in accordance with claim 11, wherein:
    said first receiving device communicates a request for said data packets for said second media content program to one or more of said available peers from said list.

13. A system in accordance with claim 12, wherein:
    said request for data packets comprises a request for anchor frames from said second media content program.

14. A system in accordance with claim 13, wherein:
    a number of anchor frames are stored at each receiving device for enabling said program switch.

15. A system in accordance with claim 13, wherein:
    said request includes a request for an initial anchor frame closest to a display time of said receiving device.

16. A system in accordance with claim 15, wherein:
    said initial anchor frame is an anchor frame with a time-stamp closest to a time t plus a current time;
    said time t comprises one of a positive number, a negative number, and zero.

17. A system in accordance with claim 15, wherein:
said initial anchor frame is downloaded, decoded, and displayed regardless of a time stamp for the initial anchor frame;
said first receiving device begins downloading additional anchor frames after said initial anchor frame is downloaded; and
said additional anchor frames are downloaded from said one or more of said peers until said first receiving device has sufficient bandwidth to download data packets containing additional anchor frames and other types of frames.

18. A system in accordance with claim 10, wherein:
said first receiving device communicates a stop command to the one or more dedicated servers providing said data packets for said first media content program after said program switch is processed.

19. A system in accordance with claim 10, wherein:
said one or more dedicated servers segregates said real-time media content into groups of data packets according to priority, including at least a high priority group of data packets and a low priority group of data packets.

20. A system in accordance with claim 19, wherein:
said high priority group of data packets for said second media content program are downloaded by said first receiving device to enable said program switch.

21. A system in accordance with claim 20, wherein:
said high priority group of data packets comprise anchor frames and associated audio packets; and
said lower priority group of data packets comprise non-anchor frames and associated audio packets.

22. A system in accordance with claim 1, wherein:
said real-time media content comprises at least one of television programs, news programs, movies, concerts, sports programs, radio programs, advertising content, television commercials, and radio commercials.

23. A method for delivering real-time media content over a communications network, comprising:
temporarily caching data packets of real-time media content by one or more dedicated servers for one or more media content programs;
providing tracking information by said one or more dedicated servers for said data packets;
storing at a control center identification information for said one or more dedicated servers;
receiving said tracking information at a plurality of receiving devices from said one or more dedicated servers and other of said plurality of receiving devices;
pushing without request said tracking information to said other of said plurality of receiving devices; and
requesting and downloading said cached data packets over the communications network for a requested media content program at each of the plurality of receiving devices from (a) said one or more dedicated servers and (b) at least one other of said plurality of receiving devices, based on at least two of: said identification information obtained from said control center; said tracking information obtained from said one or more dedicated servers; and said tracking information obtained from said other of said plurality of receiving devices;
wherein:
at least a portion of said receiving devices are configured to share resources via the communications network, enabling a download of said data packets by one receiving device from another receiving device;
a first receiving device is downloading data packets for a first media content program; and
said first receiving device is enabled to switch to a second media content program by requesting and downloading data packets for said second media content program from at least one other of said receiving devices currently downloading or caching data packets for said second media content program.

24. A method in accordance with claim 23, wherein:
the real-time media content is reconstructed at the receiving device in real time with data packets from at least one of: (a) one of said dedicated servers; (b) one or more peer receiving devices on the communications network; and (c) local memory.

25. A method in accordance with claim 23, wherein:
said first receiving device is further enabled to switch to the second media content program by also requesting and downloading the data packets for said second media content program from said one or more dedicated servers.

26. A method in accordance with claim 23, wherein:
said data packets initially downloaded for said second media content program comprise one or more anchor frames for said second media content program.

27. A method in accordance with claim 26, wherein:
said one or more anchor frames are downloaded for said second media content program until said first receiving device has sufficient bandwidth to download data packets containing additional anchor frames and other types of frames.

28. A method in accordance with claim 23, wherein:
said data packets initially downloaded for said second media content program comprise one or more anchor frame and corresponding audio data for said second media content program.

29. A method in accordance with claim 28, wherein:
said one or more anchor frames are downloaded for said second media content program until said first receiving device has sufficient bandwidth to download data packets containing additional anchor frames and other types of frames.

30. A method in accordance with claim 23, wherein:
said one or more dedicated servers comprise at least one of: (a) one or more dedicated broadcasting devices; and (b) one or more of said receiving devices.

31. A method in accordance with claim 23, further comprising:
providing a peer service associated with said control center for defining a subset of said receiving devices that comprise peers on the communications network;
wherein said download of said data packets is enabled from one peer to another peer.

32. A method in accordance with claim 31, wherein:
said first receiving device processes a program switch from said first media content program to the second media content program prior to downloading the data packets for the second media content program.

33. A method in accordance with claim 32, wherein:
a request for said program switch is communicated from said first receiving device to said peer service; and
said peer service provides to said first communication device a list of available peers on the communications network currently downloading or caching said data packets for said second media content program.

34. A method in accordance with claim 33, wherein:
said first receiving device communicates a request for said data packets for said second media content program to one or more of said available peers from said list.

35. A method in accordance with claim 34, wherein:
said request for data packets comprises a request for anchor frames from said second media content program.

36. A method in accordance with claim 35, wherein:
a number of anchor frames are stored at each receiving device for enabling said program switch.

37. A method in accordance with claim 35, wherein:
said request includes a request for an initial anchor frame closest to a display time of said receiving device.

38. A method in accordance with claim 37, wherein:
said initial anchor frame is an anchor frame with a time-stamp closest to a time t plus a current time;
said time t comprises one of a positive number, a negative number, and zero.

39. A method in accordance with claim 37, wherein:
said initial anchor frame is downloaded, decoded, and displayed regardless of a time stamp for the initial anchor frame;
said first receiving device begins downloading additional anchor frames after said initial anchor frame is downloaded; and
said additional anchor frames are downloaded from said one or more of said peers until said first receiving device has sufficient bandwidth to download data packets containing additional anchor frames and other types of frames.

40. A method in accordance with claim 32, further comprising:
communicating a stop command from said first receiving device to the one or more dedicated servers providing said data packets for said first media content program after said program switch is requested.

41. A method in accordance with claim 32, wherein:
said one or more dedicated servers segregates said real-time media content into groups of data packets according to priority, including at least a high priority group of data packets and a low priority group of data packets.

42. A method in accordance with claim 41, wherein:
said high priority group of data packets for said second media content program are downloaded by said first receiving device to enable said program switch.

43. A method in accordance with claim 42, wherein:
said high priority group of data packets comprise anchor frames and associated audio packets; and
said lower priority group of data packets comprise non-anchor frames and associated audio packets.

44. A method in accordance with claim 23, wherein:
said real-time media content comprises at least one of television programs, news programs, movies, concerts, sports programs, radio programs, advertising content, television commercials, and radio commercials.

* * * * *